United States Patent [19]
Raduly

[11] 3,796,023
[45] Mar. 12, 1974

[54] PROCESS FOR SEPARATION OF VINYL CHLORIDE FROM INERT GASES

[75] Inventor: Lajos Raduly, Rimnicu Vilcea, Romania

[73] Assignee: Grupul Industrial De Chimie Rimnicu Vilcea, Rimnicu Vilcea, Romania

[22] Filed: Jan. 24, 1972

[21] Appl. No.: 220,079

[52] U.S. Cl. .................................... 55/59, 55/71
[51] Int. Cl. .................................... B01d 53/04
[58] Field of Search ............ 55/59, 71, 74, 387, 20, 55/62, 179; 260/654 S, 656; 423/245

[56] References Cited
UNITED STATES PATENTS

| | | | |
|---|---|---|---|
| 3,085,379 | 4/1963 | Kiyonaga et al. | 55/62 |
| 3,243,938 | 4/1966 | Lavery et al. | 55/62 |
| 3,257,772 | 6/1966 | Maddox et al. | 55/20 |
| 3,446,586 | 5/1969 | Young | 260/654 S |

FOREIGN PATENTS OR APPLICATIONS

| | | | |
|---|---|---|---|
| 1,346,878 | 11/1963 | France | 55/71 |

*Primary Examiner*—Charles N. Hart
*Attorney, Agent, or Firm*—Karl F. Ross; Herbert Dubno

[57] ABSTRACT

A process for separation of vinyl chloride from inert gases.

Such process can be carried out

*a.* passing inert gases containing vinylchloride over a layer of active carbon which adsorbes vinyl chloride the inert gases being removed in the atmosphere; vinyl chloride retained on the active carbon is desorbed by means of steam separated by condensation of steam the latter being eliminated to the sewer and the layer of active carbon being dryed then coaled in order to take over the cycle

*b.* passing inert gases containing vinyl chloride over a layer of active carbon which is impregnated with hydroquinone and further proceeded as shown above. One obtains a total separation of vinyl chloride from inert gases. The active carbon has a long lasting utilization and by impregnation of the active carbon layer with hydroquinone the length of time of utilization is increased.

The installation is unsophisticated necessitating reduced investments and operation costs and the process is easily and safely managed. The consumption of utilities is reduced and no energy is consumed.

5 Claims, 1 Drawing Figure

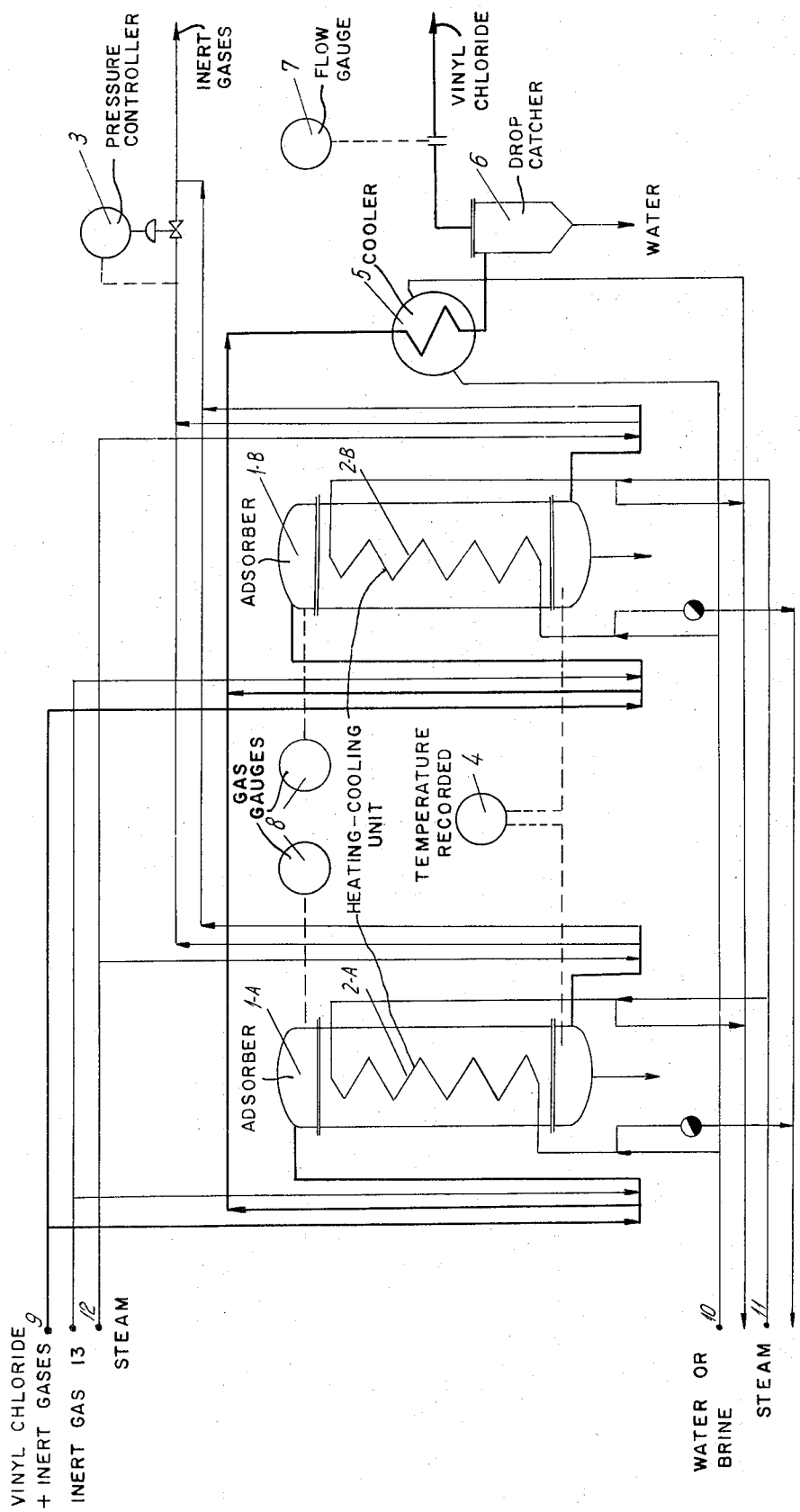

PROCESS FOR SEPARATION OF VINYL CHLORIDE FROM INERT GASES

The present invention relates to a process for separation of vinyl chloride from uncondensed inert gases usually resulted in the process for hydrochlorination of acetylene or at the degasifying of polymerization autoclave.

It is known that at the liquefaction of the gaseous vinyl chloride containing a certain quantity of inert gas, the latter remains uncondensed and contains a main quantity of gaseous vinyl chloride depending on the cooling temperature and working pressure.

It is known the process for separation of vinyl chloride from inert gases by absorption into different solvents such as dichlorethane, thichloroethylene, carbon tetrachloride, perchloro ethylene and so on, followed by the destillation of vinyl chloride from these solvents.

The disadvantages of the abovementioned process consist in that it does not achieve a total separation of vinyl chloride from inert gases, it needs an installation with large investments costs, it is a high solvents consummer and the discharged gases pollute the environment with the unabsorbed vinyl chloride and the carried solvent.

The process according to the invention avoids the above-mentioned disadvantages in that, in order to separate vinyl chloride from inert gases, the adsorption of it is made on a layer of activated carbon which is coaled by the coils disposed in the layer.

The vinyl chloride adsorbed on the activated carbon is desorbed by the heating of the layer or by introducing steam directly into the layer.

The application of the process according to the invention is illustrated in the following two exemples referring also to the FIGURE which represents the flow diagram of the installation utilized for the adsorption of vinyl chloride but which does not limit the process according to the invention.

Example 1

The installation comprises two adsorbers 1 A/B parallel bound and provided with cooling - heating units 2 A/B placed in the adsorbent layer, a pressure controller 3, a temperature recorder 4, a cooler 5, a drop catcher 6, a flow gauge 7 and two gas gauges 8.

The adsorbers work alternatively one of them being in the phase of adsorbtion and the other in the phase of desorbtion and regeneration of the layer.

In the adsorbers 1 A/B a granulated active carbon layer is placed having a granulority of 1 to 6 mm, preferably 2 to 3 mm. The inert gases containing vinyl chloride having a concentration of 2 to 50 percent by volume are intorduced into adsorber 1 A through pipe 9.

Passing gases over the layer of active carbon the total retention of vinyl chloride from gases is obtained. During the adsorption phase the active carbon layer is water cooled or brine chilled through coil 2 A put in through pipe 10, for taking over the heat evolved during the adsorption. Thus the vinyl chloride contained in gas is adsorbed on the active carbon and the inert gases which pass through the layer are removed in the atmosphere by means of the pressing controller 3.

The pressing controller 3 maintains in the system the necessary pressure in the anterior phases of the process for manufacturing vinyl chloride.

When the layer begins to saturate with the retained vinyl chloride the end of the adsorption period is to be seen by an unexpected increase of the gases temperature at the outlet of the layer, the temperature being measured by the temperature recorder 4.

At this moment the input of gases in the second adsorber is starting.

The vinyl chloride retained in the active carbon is desorbed by introducing through pipe 12, directly on the active carbon layer having a temperature of 100° to 200° C, preferably 130° to 150° C as well as by heating the layer through coil 2 A with steam at 2 to 13 ata preferably 5 to 6 ata put in through pipe 11.

The gaseous vinyl chloride desorbed of the carbon is passed through the cooler 5 for the condensation of steam. The condensed water is separated in the drop catcher 6 and is eliminated to the sewer periodically.

After desorbtion when the debit indicated by the flow gauge 7 decreases at zero, the carbon layer is dryed by passing of an inert gas flow over the layer put in through pipe 13, the heating by means of coils being maintained.

When drying is ended the layer is cooled on order to take over the cycle.

It is found that vinyl chloride is adsorbed on the active carbon which is utilized depending on the cooling temperature and its partial pressure in the quantities as mentioned below indifferently of the value of the inert gas pressure.

| Partial pressure of vinyl chloride mm. Hg | Quantity of vinyl chloride adsorbed on the carbon depending on temperature Kg VC/100 Kg | | | |
|---|---|---|---|---|
| | −10 | 5 | 20 | 35 |
| 120 | 34 | 32 | 29 | 24 |
| 167 | 41 | 38 | 34 | 29 |
| 700 | 54 | 50 | 45 | 39 |
| 1370 | — | 61 | 55 | 48 |

The adsorbtive capacity of the active carbon lasts especially when the inert gases are constituted by nitrogen or hydrogen.

Example 2

The installation as shown at the example 1 is charged with an active carbon layer impregnated with hydroquinone 0.1 to 2 percent.

An active carbon, as in example 1, is utilized. The impregnation is usually achieved by dissolving 0.1 to 2 kg hydroquinone into 200 to 500 l of water, then adding the 100 kg of active carbon and stirring for 1 hour. The active carbon impregnated with the above-mentioned solution is dryed in a dryer or even directly in the adsorber and further proceeded as in Example 1.

The impregnated active carbon retains equally vinyl chloride from gases.

The adsorbtive capacity of the impregnated active carbon lasts long and it is utilized especially when the inert gas contains oxygen too.

The process according to the invention presents the following advantages:
— it achieves a total separation of vinyl chloride from inert gases
— it utilizes an un-suphisticated installation with reduced investments and operation costs — the process is easily and safely managed
— a reduced consumtion of utilities
— it does not consume energy
— active carbon has a long lasting utilization
— by impregnation with hydroquinone the lenght of time for utilization becoms increased.

What we claim is:

1. In a process for the separation of vinyl chloride from a mixture of inert gases and vinyl chloride wherein said vinyl chloride is adsorbed on an activated-carbon layer, the improvement which comprises water-cooling or brine-chilling said layer at a temperature of −10° to +35° C and a partial pressure of from 120 to 1,370 mm. Hg. during the adsorption by circulation of the coolant through coils in the layer.

2. The improvement defined in claim 1 wherein said activated carbon is impregnated with 0.1 to 2.0 percent hydroquinone.

3. A process for the separation of vinyl chloride from a mixture of inert gases therewith comprising the steps of:

adsorbing said vinyl chloride on an activated-carbon layer having granules of 1 to 6 mm particle size while cooling said layer and maintaining it at a temperature of about −10° to +35° C to remove said vinyl chloride from said mixture;

withdrawing said inert gases from said layer after adsorption of the vinyl chloride;

desorbing said vinyl chloride from said layer by heating the activated carbon with steam at a temperature of about 100° to 200° C, condensing said steam, removing the condensate and releasing the desorbed vinyl chloride;

regenerating said activated-carbon layer after desorption by heating said layer and passing a stream of inert gas thereover; and impregnating said activated-carbon layer with hydroquinone prior to adsorption.

4. The process defined in claim 3 wherein:

said granules are of a particle sized 2 to 3 mm;
said layer is impregnated with about 0.1 to 2 percent hydroquinone;
during desorption the temperature to which said layer is heated is about 130° to 150° C; and
during adsorption, said layer is water-cooled.

5. The process defined in claim 3 wherein, during adsorption, said layer is cooled by being brine-chilled.

* * * * *